US012591428B2

(12) United States Patent (10) Patent No.: US 12,591,428 B2
Mihani et al. (45) Date of Patent: Mar. 31, 2026

(54) AUTOMATED SOFTWARE VALIDATION FOR CONTINUOUS DEPLOYMENT IN AN INFORMATION PROCESSING SYSTEM

(71) Applicant: Dell Products L.P., Round Rock, TX (US)

(72) Inventors: Avinash Mihani, Bengaluru (IN); Tatayyababu Kasani, Relangi (IN); Sunileswar Behera, Hyderabad (IN); Archana H, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 320 days.

(21) Appl. No.: 18/335,270

(22) Filed: Jun. 15, 2023

(65) Prior Publication Data

US 2024/0419439 A1     Dec. 19, 2024

(51) Int. Cl.
| | |
|---|---|
| *G06F 11/34* | (2006.01) |
| *G06F 8/60* | (2018.01) |
| *G06F 8/71* | (2018.01) |
| *G06F 9/445* | (2018.01) |
| *G06F 9/455* | (2018.01) |
| *G06F 11/36* | (2025.01) |

(52) U.S. Cl.
CPC . *G06F 8/71* (2013.01); *G06F 8/60* (2013.01)

(58) Field of Classification Search
CPC ... G06F 8/71; G06F 8/50; G06F 21/64; G06F 21/57; G06F 8/63; G06F 21/577; G06F 8/60; G06F 9/45558; G06F 11/3616; G06F 8/61; G06F 21/121; G06F 8/65; G06F 8/75; G06F 11/3409; G06F 8/77;

G06F 8/73; G06F 11/3698; G06F 11/3452; G06F 11/302; G06F 11/3604; G06F 11/3457; G06F 9/455; G06F 16/254; G06N 3/04; G06N 3/042; G06N 3/0464
See application file for complete search history.

(56) References Cited

U.S. PATENT DOCUMENTS

| | | | | |
|---|---|---|---|---|
| 11,675,908 | B2 * | 6/2023 | Suryanarayana | ..... H04L 9/3247 |
| | | | | 717/177 |
| 12,314,406 | B1 * | 5/2025 | Cameron | .............. G06F 21/577 |

(Continued)

OTHER PUBLICATIONS

Tech Notes, Ensuring Accurate and Consistent Deployment of Custom Script Function Libraries, 11 pages (Year: 2009).*

(Continued)

*Primary Examiner* — Thuy Dao
(74) *Attorney, Agent, or Firm* — Ryan, Mason & Lewis, LLP

(57)     ABSTRACT
Automated validation of software code is disclosed. In one example, a method comprises the following steps. The method evaluates software code to be deployed in an execution environment. The method identifies one or more factors that affect deployment of the software code in the execution environment. The method automatically validates the one or more factors prior to deployment of software code in the execution environment. The automated pre-validation may mitigate or eliminate deployment problems prior to actual deployment in the execution environment thereby preserving significant processing platform resources of the execution environment.

20 Claims, 36 Drawing Sheets

800

802 — EVALUATE SOFTWARE CODE TO BE DEPLOYED IN AN EXECUTION ENVIRONMENT

804 — IDENTIFY ONE OR MORE FACTORS THAT AFFECT DEPLOYMENT OF THE SOFTWARE CODE IN THE EXECUTION ENVIRONMENT

806 — AUTOMATICALLY VALIDATE THE ONE OR MORE FACTORS PRIOR TO DEPLOYMENT OF SOFTWARE CODE IN THE EXECUTION ENVIRONMENT

(56) References Cited

U.S. PATENT DOCUMENTS

| | | | |
|---|---|---|---|
| 2014/0130036 A1* | 5/2014 | Gurikar | G06F 8/62 |
| | | | 717/176 |
| 2019/0005239 A1* | 1/2019 | Park | G06F 21/563 |
| 2024/0256242 A1* | 8/2024 | Goyer | G06F 11/3604 |

OTHER PUBLICATIONS

T. Lehtonen et al., "Defining Metrics for Continuous Delivery and Deployment Pipeline," Symposium on Programming Languages and Software Tools, Oct. 2015, pp. 16-30.
Wikipedia, "Continuous Integration," https://en.wikipedia.org/w/index.php?title=Continuous_integration&oldid=1063426859, Jan. 3, 2022, 9 pages.
Wikipedia, "CI/CD," https://en.wikipedia.org/w/index.php?title=CI/CD&oldid=1062446811, Dec. 28, 2021, 2 pages.
Wikipedia, "Continuous Delivery," https://en.wikipedia.org/w/index.php?title=Continuous_delivery&oldid=1054685039, Nov. 11, 2021, 6 pages.
Wikipedia, "Continuous Deployment," https://en.wikipedia.org/w/index.php?title=Continuous_deployment&oldid=1050036713, Oct. 15, 2021, 2 pages.
M. Jachkowski, "Easy Error Resolution," Conducto; https://medium.com/conducto/easy-error-esolution-b9f2b54f22b7; Apr. 21, 2020, 12 pages.
M. Grasberger, "Experiencing Broken Builds in your CI/CD Pipeline? These Best Practices Related to Credentials, Flaky Tests and Alerts can Boost Productivity and Confidence," https://www.techtarget.com/,earchsoftwarequality/tip/Identify-and-fix-broken-builds-with-CI-CD-pipelines; Jun. 1, 2022, 4 pages.
Undo, "CI/CD What to do About Failing Tests," https://undo.io/resources/what-to-do-about-failing-tests/; Accessed Jan. 11, 2023, 9 pages.

* cited by examiner

200

400

```
cluster_auth()
{
   echo -e "===================================\nCluster Authentication check
${On_Yellow}${1}${No_Color}\n--------------------------------"
   echo -e "${VAULT_CONFIG_PATH} used --> ${On_Yellow}$1${No_Color} "
   echo -e "----------------------------------\nCluster authentication check for
$VAULT_HARBOR_SECRET_PATH\n-------------------------------"
   curl ${KUBECONFIG_CLI_SH} > vaultcli.sh;source vaultcli.sh ${1}
   PKS_CONFIG=$(vault kv get -format json -field=data ${VAULT_CONFIG_PATH})
        is_config=$(echo $PKS_CONFIG | jq .clusters[0].name ) ; echo "Cluster name --> ${is_config}"
        if [ ${is_config,,} != "null" ]; then
      vault token revoke --self >/dev/null
      echo ${PKS_CONFIG} > $KUBECONFIG
      Error=$( { kubectl get ns; } 2>&1 >/dev/null )
      ErrorTxt=`echo "${Error}" | head -1`
      if [[ -z $Error ]]; then
         echo -e "${On_Green}Cluster Authenticated successfully via Kubeconfig${No_Color}";
         echo -e "${job}|Cluster Authentication|PASSED" >> report.txt
               else
         echo -e "${On_Red}Cluster Authentication failed${No_Color}"
         echo -e "${job}|Cluster Authentication|FAILED" >> report.txt;
         echo -e "${job}|Cluster Authentication|FAILED|${ErrorTxt} !!Please validate Kubeconfig file"
>> errors.txt;
      fi
   fi
   echo -e "===================================\n\n"
}
```

FIG. 6A

```
foreach (var servername in servernameList)
{
   Reporter.Output.WriteLine("Connection Validation for server : " + servername + " username :" + username);

Reporter.Output.WriteLine("****************************************************************
*****************");
   foreach (var database in databaseList)
   {
      if (String.IsNullOrEmpty(servername.Trim()) || String.IsNullOrEmpty(database.Trim()) ||
servername.StartsWith("$") || database.StartsWith("$") ||
         servername == "null" || database == "null")
      {
         Reporter.Output.WriteLine("ServerName: " + servername + " | Database : " + database);

Reporter.Output.WriteLine("****************************************************************
*****************");
         Reporter.Error.WriteLine("ServerName and Database should not be null (OR) empty. Please provide
valid details.");
         return false;
      }
      string output = Execute.ConnectionValidation(servername, username, password, database, auth,
isMultiSubnet, loginTimeout, "SELECT DB_NAME();").Output;
      if (output.ToUpper().Contains(database.ToUpper()))
      {
         Reporter.Error.WriteLine("Connection established with Database : " + database);
         isConnected = true;
      }
      else
      {
         Reporter.Error.WriteLine("Connection not established with ServerName: " + servername + " | Database
: " + database);
         Reporter.Error.WriteLine("Please provide valid ServerName and Database");
      }

}
   Reporter.Output.WriteLine("------------------------------------------------------------------------------");
}
```

FIG. 6B

```
docker_auth()
{
   echo -e "===================================\nDocker authentication check with vault
VAULT_HARBOR_SECRET_PATH ${On_Yellow}${1}${No_Color}\n----------------------------------"
   echo -e "VAULT_HARBOR_SECRET_PATH used --> ${On_Yellow}${1}${No_Color} "
   echo -e "----------------------------------\nDocker authentication check for $VAULT_HARBOR_SECRET_PATH\n----------
-----------------------"
   curl ${VAULT_CLI_SH} > vaultcli.sh;source vaultcli.sh ${1}
   Error=$( { echo $HARBOR_PASSWORD | docker login -u $HARBOR_USERNAME --password-stdin
$HARBOR_SERVER; } 2>&1 >/dev/null )
   ErrorTxt=`echo "${Error}" | head -1`
   if [[ -z $Error ]]; then
     echo -e "${On_Green}docker authentication was successful for VAULT_HARBOR_SECRET_PATH
${VAULT_HARBOR_SECRET_PATH}${No_Color} "
     echo -e "${job}|Docker Authentication|PASSED" >> report.txt
   elif [[ $(echo $Error | grep "WARNING" | wc -l) -gt 0 ]]; then
     echo -e "Docker Authentication successful with warning ${Error}\n"
     echo -e "${job}|Docker Authentication|WARNING" >> report.txt
     echo -e "${job}|Docker Authentication|WARNING|${ErrorTxt} !! Docker authentication Passed with warning"
>> errors.txt
   else
     echo -e "Docker Authentication FAILED Please validate credentials in ${VAULT_HARBOR_SECRET_PATH} \n"
     echo -e "${job}|Docker authentication|FAILED" >> report.txt;
     echo -e "${job}|Docker authentication|FAILED|${ErrorTxt} !! Docker authentication FAILED with vault
VAULT_HARBOR_SECRET_PATH ${VAULT_HARBOR_SECRET_PATH}" >> errors.txt
   fi
   echo -e "===================================\n\n"
}
```

FIG. 6C

```
pcf_auth()
{
   echo -e "=================================\nPCF authentication check with vault SECRET_PATH
${On_Yellow}${1}${No_Color}\n---------------------------------"
   echo -e "PCF_SECRET_PATH used --> ${On_Yellow}${1}${No_Color} "
   curl ${VAULT_CLI_SH} > vaultcli.sh;source vaultcli.sh ${1}
   Error=$( { echo ${password} | cf login -u ${username} -a ${api} -o ${org} -s ${space}; } 2>&1 >/dev/null )
   ErrorTxt=`echo "${Error}" | head -1`
   if [[ -z $Error ]]; then
      echo -e "${On_Green} PCF authentication was successful for SECRET_PATH ${SECRET_PATH}${No_Color} "
      echo -e "${job}|PCF authentication|PASSED" >> report.txt
   else
      echo -e "${On_Red} PCF authentication FAILED with vault SECRET_PATH ${SECRET_PATH}${No_Color} "
      echo -e "${job}|PCF authentication|FAILED" >> report.txt
      echo -e "${job}|PCF authentication|${ErrorTxt} !! PCF authentication FAILED with vault SECRET_PATH
${SECRET_PATH}" >> errors.txt
   fi
   echo -e "=================================\n\n"
}
```

FIG. 6D

```
function Test-ServerAccess {
  [CmdletBinding()]
  param (
    $computerName,
    $serviceUsername,
    $servicePassword
  )

begin {
    $SecureString = ConvertTo-SecureString -String $servicePassword -AsPlainText -Force
    $cred = New-Object -typename System.Management.Automation.PSCredential $serviceUsername,
$SecureString
    $result = "Passed"
  } process {
    try {
      $session = New-PSSession -ComputerName $computerName -Credential $cred -ErrorAction stop
      Remove-PSSession -Session $session -ErrorAction Stop
    }
    catch {
      $result = "Failed"
    }
    return $result
  }
  end {

```
manifest_file()
{
    echo -e "====================================\nChecking if Manifest file path
${On_Yellow}${1}${No_Color} exists\n----------------------------------"
    echo -e "MANIFEST_PATH is --> ${On_Yellow}${1}${No_Color} "
    if [ -e ${1} ] && [ -n ${1} ]; then
        echo -e "${On_Green}Manifest file path ${1} is valid${No_Color} "
        echo -e "${job}|Manifest existence check|PASSED" >> report.txt
    else
        echo -e "${On_Red} Manifest file path ${1} does not exist${No_Color}";
        echo -e "${job}|Manifest existence check|FAILED" >> report.txt;
        echo -e "${job}|Manifest existence check|Manifest file path ${1} does not exist" >> errors.txt;
    fi
    echo -e "====================================\n\n"
}
```

FIG. 6F

```
FILE_EXISTENCE_CHECK()
{
   echo -e "================================\nFile Existance check ${On_Yellow}${1}${No_Color}\n-------
-------------------------"
   echo -e "${2} FILE exist at --> ${On_Yellow}${1}${No_Color} Path "
   echo -e "\nChecking if FILE path ${1} exists\n"
   if [ -e $1 ]; then
      echo -e "${On_Green}Provided FILE path ${1} is valid${No_Color}"
      echo -e "${job}|File Existance|PASSED " >> report.txt
   else
      echo -e "${On_Red}File Existance check for ${1} failed${No_Color}"
      echo -e "${job}|File Existance|FAILED" >> report.txt;
      echo -e "${job}|File Existance of ${1}|FAILED|Mentioned file path does not exist !!Please Validate ${1} path is
valid" >> errors.txt
   fi
   echo -e "================================\n\n"
}
```

FIG. 6G

```
artifact_existence(){
    echo -e "===================================\nChecking if Artifact
${On_Yellow}${1}/${2}/${3}${No_Color} exists\n---------------------------------"
    echo -e "Artifact existence at --> ${On_Yellow}${1}/${2}/${3}${No_Color} will be validated"
    curl ${VAULT_CLI_SH} > vaultcli.sh;source vaultcli.sh ${4}
    Error=$( { curl --silent -I -sSf -H "X-JFrog-Art-Api:${APIKEY}" "${1}/${2}/${3}"; } 2>&1 >/dev/null )
    ErrorTxt=`echo "${Error}" | head -1`
    if [[ -z ${Error} ]]; then
       echo -e "${On_Green}Artifact ${2}/${3} exists${No_Color}";
       echo -e "validate-prerfc-oracle|Artifact existence check|PASSED" >> report.txt
    else
       echo -e "${On_Red}Please validate if the Artifact ${3} exist at ${1}/${2}${No_Color}";
       echo -e "validate-prerfc-oracle|Artifact existence check|FAILED" >> report.txt
       echo -e "validate-prerfc-oracle|Artifact existence check|${ErrorTxt} !! Please validate if the Artifact
${3} exist at ${1}/${2}" >> errors.txt
    fi
    echo -e "===================================\n\n"
    }
```

FIG. 6H

```
foreach (Script script in scripts)
{
        string[] lines = System.IO.File.ReadAllLines(script.ScriptFileInfo.FullName).Where(x =>
!string.IsNullOrEmpty(x)).ToArray();
    var ObjectsList = lines.Where(a => a.ContainIgnoreCase("DROP ", StringComparison.CurrentCultureIgnoreCase));
    foreach (var ObjectList in ObjectsList)
    {
      if ((!ObjectList.Trim().StartsWith("--") && (!ObjectList.Trim().StartsWith("/**")) &&
(!ObjectList.Trim().StartsWith("/*"))))
      {

IdentifyObjectOperations(ObjectList, script, objOperations, objTypes);
        strOperation = script.ObjectOperation.Trim();
        strObjectType = script.ObjectType.Trim();

if (ObjectList.Contains('.'))
        {
                                script.ObjectName = Helper.FindObjectNamewithSchema(ObjectList);
        }
        else
        {
                                script.ObjectName = Helper.RemoveSpacesFindObjectName(ObjectList,
strObjectType.ToUpper());
        }
        if (script.ObjectName != "")
                                strObjectName = Helper.RemoveObjectNameBrackets(script.ObjectName);
        else
                                strObjectName =
Helper.RemoveSpacesFromArray(ObjectList)[Helper.RemoveSpacesFromArray(ObjectList).Length - 1].Trim();
                                strFileName = script.ScriptFileInfo.Name.ToLower();
                                strFileNames.Add(strFileName);
                                strObjectTypes.Add(strObjectType);
                                strOperations.Add(strOperation);
                                strObjectNames.Add(strObjectName.Replace(";", "").Trim());
      }
    }
    script.StepCount = ++count;
}
```

FIG. 6I

```
 ############# DROP operations existance Check #################
OPERATION_STATUS=$(grep -e "DROP operations" rapid.txt && echo " || echo ")
if [ -z "${OPERATION_STATUS}" ];
then
   echo -e "${job}|Operations validation|PASSED \n" >> report.txt
else
   echo -e "${On_Red}WARNING! DROP operations found please check${No_Color}";
   echo -e "${job}|Operations validation|PASSED \n" >> report.txt
fi
```

FIG. 6J

```
function solidcoretest{
   [CmdletBinding()]
   param (
      [string]
      $servers,
      $deploy_username,
      $deploy_Password
   )

begin {
      $result = "Passed"

$servers=$servers.split(",")
$cred = New-Object System.Management.Automation.PSCredential ($deploy_username, (ConvertTo-SecureString
$deploy_password -AsPlainText -Force))
}
process {
try {
foreach($server in $servers){
[Net.ServicePointManager]::SecurityProtocol = [Net.SecurityProtocolType]::Tls12
Invoke-WebRequest -UseBasicParsing "https://artifacts.dell.com/artifactory/cicd-1003184-generic-prd-
local/traditional/devops-tools/7za.exe" -OutFile "$ENV:CI_PROJECT_DIR\7za.exe"

Invoke-WebRequest "https://artifacts.dell.com/artifactory/cicd-1003184-generic-prd-local/traditional/td-
dev/DotNet_Deployment.zip" -OutFile $ENV:CI_PROJECT_DIR\DotNet_Deployment.zip
Invoke-Command -ComputerName $server -Credential $cred -ScriptBlock {
if(Test-Path "C:\Temp\solidcoretest"){ } else { mkdir C:\temp\solidcoretest}
}
net use \\$server /user:$deploy_username $deploy_password | Out-Null
copy-item "$ENV:CI_PROJECT_DIR\DotNet_Deployment.zip"
"\\$server\C$\temp\solidcoretest\DotNet_Deployment.zip" -Recurse -Force
if (Test-Path "\\$server\C$\temp\solidcoretest\7za.exe"){ }
else {
copy-item "$ENV:CI_PROJECT_DIR\7za.exe" "\\$server\C$\temp\solidcoretest" -Recurse -Force | Out-Null
}
net use \\$server /del /y | Out-Null
Invoke-Command -ComputerName $server -Credential $cred -ScriptBlock {
 $tempPath = "C:\temp\solidcoretest"
 if ("Test-Path $tempPath\DotNet_Deployment.zip") {
   & $tempPath/7za.exe x $tempPath\DotNet_Deployment.zip -o"$tempPath\DotNet_Deployment\" -y | Out-Null }
   }
   }
   }
   catch {
       $result = "Failed"
   }
   $result
}
end {}
}
```

FIG. 6K

```
function EnabledisableSMB{
  [CmdletBinding()]
  param (
    [string]
    $srvr,
    $deploy_username,
    $deploy_Password,
    $status
  )

begin {
    $result = "Passed"
 # }
if ($srvr -match ",") { $server = $srvr.split(',') } foreach ($srvr in $server) {
write-host
"=============================================================================================="
write-host "srvr:$srvr"

$pass=ConvertTo-SecureString -String $deploy_Password -AsPlainText -ErrorAction Stop -Force
$Cred=New-Object -TypeName System.Management.Automation.PSCredential $deploy_Username, $pass
}
}
process {
try {
Invoke-Command -Credential $Cred -ComputerName $srvr -ErrorAction Stop -ScriptBlock {

$get_status =(Get-SmbServerConfiguration | Select EnableSMB2Protocol).EnableSMB2Protocol if(($using:status -match 'disable') -and ($get_status -match 'true')){
if($using:status -eq 'disable'){
Set-SmbServerConfiguration -EnableSMB2Protocol $false -Force
Get-SmbServerConfiguration | Select EnableSMB2Protocol
}}
if(($using:status -match 'enable') -and ($get_status -match 'false')){
if($using:status -eq 'enable'){
Set-SmbServerConfiguration -EnableSMB2Protocol $true -Force
Get-SmbServerConfiguration | Select EnableSMB2Protocol
}} if($using:status -match 'status'){
Get-SmbServerConfiguration | Select EnableSMB2Protocol
}
}
}     catch {
        $result = "Failed"
      }
      $result
  }
  end {
}
}
```

FIG. 6L

```
function Test-ExecutionPolicy {
  [CmdletBinding()]
  param (
    [string]
    $ComputerName,
    $ServiceUsername,
    $ServicePassword,
    $RequiredPolicy
  )

begin {
    $result = "Passed"
    $SecureString = ConvertTo-SecureString -String $ServicePassword -AsPlainText -Force
    $cred = New-Object -typename System.Management.Automation.PSCredential $ServiceUsername, $SecureString
    $sb = {
      Param(
        $RequiredPolicy
      )
      $ExecutionPolicy = Get-ExecutionPolicy
      if ($ExecutionPolicy -eq [Microsoft.PowerShell.ExecutionPolicy]$RequiredPolicy) {
        "Passed"
      }
    }
  } process {
    try {
      $session = New-PSSession -ComputerName $ComputerName -Credential $cred -ErrorAction stop
      $ReqExecutionPolicyStatus = Invoke-Command -Session $session -ArgumentList $RequiredPolicy -ScriptBlock $sb
      if ($ReqExecutionPolicyStatus -ne "Passed") {
        $result = "Failed"
      }
      Remove-PSSession -Session $session -ErrorAction Stop
    }
    catch {
      $result = "Failed"
    }
    return $result
  }
  end {
  }
}
```

FIG. 6M

```
# Artifact variables
if [ -z ${ARTIFACT_SECRET_PATH} ]; then echo -e "${On_Red} Please provide Artifactory Vault secret path to the
variable ARTIFACT_SECRET_PATH ${No_Color}"; exit 1; else echo -e "${On_Yellow} ARTIFACT_SECRET_PATH is
$ARTIFACT_SECRET_PATH ${No_Color}"; fi if [ -z ${UPLOAD_PATH} ]; then echo -e "${On_Red} Please provide Artifactory upload path to the variable
UPLOAD_PATH ${No_Color}"; exit 1; else echo -e "${On_Yellow} UPLOAD_PATH is $UPLOAD_PATH ${No_Color}"; fi if [ -z ${UPLOAD_FILENAME} ]; then echo -e "${On_Red} Please provide Artifact name to the variable
UPLOAD_FILENAME ${No_Color}"; exit 1; else echo -e "${On_Yellow} UPLOAD_FILENAME is $UPLOAD_FILENAME
${No_Color}"; fi
```

FIG. 6N

```
====================================REPORT========================================
DEPLOY JOB NAME      VALIDATION            RESULT
--------------       --------------        --------------
deploy_prod_pri_canary  Manifest existence check  PASSED
deploy_prod_pri_canary  Artifact existence check  PASSED
deploy_prod_sec_canary  Manifest existence check  PASSED
deploy_prod_sec_canary  Artifact existence check  PASSED
deploy_prod_pri_stable  Manifest existence check  PASSED
deploy_prod_pri_stable  Artifact existence check  PASSED
deploy_prod_sec_stable  Manifest existence check  PASSED
deploy_prod_sec_stable  Artifact existence check  PASSED
=================================================================================
Disclaimer! If your Status is Showing FAILED, Please scroll up in logs to check for the reason for failure under FAILURE
DESCRIPTION section
```

FIG. 7A

```
========================= FAILURE DESCRIPTION ==========================
PCF authentication for deploy-prod-secondary--------------------------------
DEPLOY JOB NAME: deploy -prod-secondary
VALIDATION: PCF authentication
STATUS: FAILED
FAILURE: Credentials were rejected, please try again. !! PCF authentication FAILED with vault SECRET_ PATH kv/PCF/S3B
-----------------------------------------------------------------------------------
============================================================================
============================ REPORT ================================
DEPLOY JOB NAME            VALIDATION                RESULT
-------------------        -----------------         ---------
deploy-prod-primary        Manifest existence check  PASSED
deploy-prod-primary        PCF authentication        PASSED
deploy-prod-secondary      Manifest existence check  PASSED
deploy-prod-secondary      PCF authentication        FAILED
============================================================================
Disclaimer! If your Status is Showing FAILED, Please scroll up in logs to check for the reason for failure under FAILURE
DESCRIPTION section
```

FIG. 7B

```
============================================================================================
===
working job deploy-prod-secondary
Authenticating to vault using JWT
https://hcvault-nonprod.dell.com;devops/cicd;jwt_gitlab;jwt_gitlab_cicd_role;kv/VM/PROD2;
Successfully retrieved secrets from kv/VM/PROD2
Job_Name                Validation              STATUS
--------                ----------              ------
deploy-prod-primary     Servername              R2CDLDDCYPNYI04.AUS.AMER.DELL.COM
deploy-prod-primary     Connection              Passed
deploy-prod-primary     Access                  Passed
deploy-prod-primary     Req.ExecutionPolicy     Passed
deploy-prod-primary     SMBSTATUS                Passed
deploy-prod-primary     solidcoretest           Passed
deploy-prod-secondary   Servername              R2CDLDDCYPNYI04.AUS.AMER.DELL.COM
deploy-prod-secondary   Connection              Passed
deploy-prod-secondary   Access                  Passed
deploy-prod-secondary   Req.ExecutionPolicy     Passed
deploy-prod-secondary   SMBSTATUS               Passed
deploy-prod-secondary   solidcoretest           Passed
```

FIG. 7C

```
------------------------------------------------------------------------
Job_Name: deploy-prod-primary
Validation: AccessStatus
Status: Failed
Comment: Verify the credentials you gave are valid and the server can be reachable.
------------------------------------------------------------------------
------------------------------------------------------------------------
Job_Name: deploy-prod-primary
Validation: ReqExecutionPolicyStatus
Status: Failed
Comment: Verify the server is set to ExecutionPolicy as remotely-signed or unrestricted.
------------------------------------------------------------------------
------------------------------------------------------------------------
Job_Name: deploy-prod-primary
Validation: SMBStatus
Status: Failed
Comment: Verify the server is enabled for file sharing ex: \\SERVER\c$
------------------------------------------------------------------------
------------------------------------------------------------------------
Job_Name: deploy-prod-primary
Validation: Solidcoretest
Status: Failed
Comment: Verify the server is enabled for solidcore, if it is disabled please enable.
------------------------------------------------------------------------
=======================================================================================
working job deploy-prod-secondary
Authenticating to vault using JWT
https://hcvault-nonprod.dell.com;devops/cicd;jwt_gitlab;jwt_gitlab_cicd_role;kv/VM/PROD2;
Successfully retrieved secrets from kv/VM/PROD2
System error 1219 has occurred.
Multiple connections to a server or shared resource by the same user, using more than one user name, are not
allowed. Disconnect all previous connections to the server or shared resource and try again.
Job_Name          Validation       STATUS
--------          ----------       ------
deploy-prod-primary  Servername       R2CDLDDCJGZAT31.aus.amer.dell.com
deploy-prod-primary  Connection       Passed
deploy-prod-primary  Access           Failed
deploy-prod-primary  Req.ExecutionPolicy Failed
deploy-prod-primary  SMBSTATUS        Failed
deploy-prod-primary  solidcoretest    Failed
deploy-prod-secondary Servername      R2CDLDDCYPNYI04.AUS.AMER.DELL.COM
deploy-prod-secondary Connection       Passed
deploy-prod-secondary Access           Passed
deploy-prod-secondary Req.ExecutionPolicy Passed
deploy-prod-secondary SMBSTATUS        Passed
deploy-prod-secondary solidcoretest    Passed
```

FIG. 7D

```
*************************************************************************
Pre-deploy checks:
*************************************************************************
-----------------------------------------------------------------------
Connection successful with following credentials...
TNS: (DESCRIPTION=(ADDRESS=(PROTOCOL=TCP)(HOST=SERVER.com)(PORT=1521))(CONNECT_DATA=(SERVER=DEDICATED)(SERVICE_NAME=SER
VICE.com)))
SCHEMA: TESTSCHEMA
Connection successful with following credentials...
TNS: (DESCRIPTION=(ADDRESS=(PROTOCOL=TCP)(HOST=SERVER.com)(PORT=1521))(CONNECT_DATA=(SERVER=DEDICATED)(SERVICE_NAME=SER
VICE.com)))
SCHEMA: SIT_SCHEMA
-----------------------------------------------------------------------
*************************************************************************
No pre-deployment issues were found. Please proceed forward.
*************************************************************************
Cleaning up project directory and file based variables
00:01
Job succeeded
```

FIG. 7E

```
***********************************************************************************
Pre-deploy checks:
***********************************************************************************

--------------------------------------------------------------------------------
Connection was not established. Please validate the following credentials.
TNS:
(DESCRIPTION=(ADDRESS=(PROTOCOL=TCP)(HOST=SERVER.aus.amer.dell.com)(PORT=1521))(CONNECT_DATA=(SERVER=DEDICATED)(SERVICE_NA
ME=SERVICE.com)))
SCHEMA: TESTSCHEMA
--------------------------------------------------------------------------------
***********************************************************************************
***********************************************************************************
Cleaning up project directory and file-based variables
00:00
ERROR: Job failed: command terminated with exit code 1
```

FIG. 7F

```
========================================================================================
=================================REPORT=================================================
DEPLOY JOB NAME  VALIDATION          RESULT
---------------  ---------------      ---------------
pks-deploy-prod  Docker Authentication   WARNING
pks-deploy-prod  Cluster Authentication  PASSED
pks-deploy-prod  File Existence       PASSED
pks-deploy-prod  File Existence       PASSED
pks-deploy-prod  Name Validation        PASSED
pks-deploy-prod  Name Validation        PASSED
========================================================================================
Disclaimer! If your Status is Showing FAILED, Please scroll up in logs to check for the reason for failure under FAILURE
DESCRIPTION section
```

FIG. 7G

```
=============================FAILURE DESCRIPTION===================================
Docker Authentication for pks-deploy-prod-------------------------------
DEPLOY JOB NAME: pks-deploy-prod
VALIDATION: Docker Authentication
STATUS: WARNING
FAILURE: WARNING! Your password will be stored unencrypted in /root/.docker/config.json. !! Docker authentication
Passed with warning
------------------------------------------------------------------

Cluster Authentication for pks-deploy-prod------------------------------
DEPLOY JOB NAME: pks-deploy-prod
VALIDATION: Cluster Authentication
STATUS: FAILED
FAILURE: Error from server (Forbidden): namespaces is forbidden: User "system:serviceaccount:glr-shared:default" cannot
list resource "namespaces" in API group "" at the cluster scope !!Please validate Kubeconfig file
------------------------------------------------------------

===================================================================================
===================================REPORT=========================================
DEPLOY JOB NAME  VALIDATION          RESULT
--------------- ---------------       ---------------
pks-deploy-prod Docker Authentication  WARNING
pks-deploy-prod Cluster Authentication FAILED
pks-deploy-prod File Existence       PASSED
pks-deploy-prod File Existence       PASSED
pks-deploy-prod Name Validation       PASSED
pks-deploy-prod Name Validation       PASSED ===================================================================================
Disclaimer! If your Status is Showing FAILED, Please scroll up in logs to check for the reason for failure under FAILURE
DESCRIPTION section
```

FIG. 7H

```
================Artifact existence validation===================
Checking if Artifact https://artifacts.dell.com/artifactory/cicd-1003184-generic-prd-local/dotnetcore-sample-pcf-
824703c1.tar.gz exists
------------------------------------
Artifact existence at --> https://artifacts.dell.com/artifactory/cicd-1003184-generic-prd-local/dotnetcore-sample-
pcf-824703c1.tar.gz will be validated
 % Total   % Received % Xferd  Average Speed  Time   Time    Time Current
                       Dload  Upload  Total  Spent   Left  Speed
100  1960  100  1960   0    0  16065     0 --:--:-- --:--:-- --:--:-- 16065
VAULT_ADDR is xxxxxxxxxxxxxxxxxxxxxxxxxxxxx
VAULT_NAMESPACE is xxxxxxxxxxxxxxxxxxxxxxxxxxxxx
VAULT_JWT_PATH is xxxxxxxxxxxx
VAULT_JWT_ROLE is xxxxxxxxxxxxxxxxxxxxx
SECRET_PATH is xxxxxxxxxxxxxxxxxxxxx
Successfully retrieved secrets from kv/ARTIFACTORY
Artifact cicd-1003184-generic-prd-local/dotnetcore-sample-pcf-824703c1.tar.gz exists
==================================
```

FIG. 7I

```
============================FAILURE DESCRIPTION================================
Artifact existence check for deploy-prod-primary-----------------------------
DEPLOY JOB NAME: deploy-prod-primary
VALIDATION: Artifact existence check
STATUS: FAILED
FAILURE: curl: (22) The requested URL returned error: 404 !! Please validate if the Artifact dotnetcore-sample-pcf-
659c9851.tar.gz exist at https://artifacts.dell.com/artifactory/cicd-1003184-generic-prd-local
-----------------------------------------------------------
Artifact existence check for deploy-prod-secondary------------------------------
DEPLOY JOB NAME: deploy-prod-secondary
VALIDATION: Artifact existence check
STATUS: FAILED
FAILURE: curl: (22) The requested URL returned error: 404 !! Please validate if the Artifact dotnetcore-sample-pcf-
659c9851.tar.gz exist at https://artifacts.dell.com/artifactory/cicd-1003184-generic-prd-local
-----------------------------------------------------------
=================================================================================
================================REPORT=========================================
DEPLOY JOB NAME      VALIDATION           RESULT
---------------      ---------------      ---------------
deploy-prod-primary    Manifest existence check  PASSED
deploy-prod-primary    Artifact existence check  FAILED
deploy-prod-secondary  Manifest existence check  PASSED
deploy-prod-secondary  Artifact existence check  FAILED
=================================================================================
Disclaimer! If your Status is Showing FAILED, Please scroll up in logs to check for the reason for failure under FAILURE
DESCRIPTION section
```

FIG. 7J

```
====================Variables validation================
PROJECT_ID is <PROJECT_ID>
ARTIFACT_SECRET_PATH is <ARTIFACT_SECRET_PATH>
UPLOAD_PATH is <UPLOAD_PATH>
UPLOAD_FILENAME is <UPLOAD_FILENAME>
DB_VAULT_ADDR is <DB_VAULT_ADDR>
VAULT_DB_NAMESPACE is <VAULT_DB_NAMESPACE>
DB_VAULT_ROLE_ID is <DB_VAULT_ROLE_ID>
DB_DEPLOY_ROLE is <DB_DEPLOY_ROLE>
TNS is <TNS>
```

FIG. 7K

```
$ curl $PRECHECK_DB_SH > precheck.sh;source precheck.sh --PROJECT_ID $PROJECT_ID –TNS $TNS –
WALLET_DIR $WALLET_DIR
 % Total   % Received % Xferd  Average Speed  Time   Time    Time Current
                   Dload  Upload  Total  Spent  Left Speed
100  1983  100  1983   0    0  16525    0 --:--:-- --:--:-- --:--:-- 16663
PROJECT _ID is <PROJECT_ID>
Please Provide Personal Access Token to validate merge request approval to the variable PVT_TOKEN
Cleaning up project directory and file-based variables ERROR: Job failed: command terminated with exit code 1
```

FIG. 7L

```
*****************************************************************************
Pre-deploy checks:
*****************************************************************************

---------------------------------------------------------------------------
Connection successful with following credentials...
TNS: (DESCRIPTION=(ADDRESS=(PROTOCOL=TCP)(HOST=SERVER.com)(PORT=1521))(CONNECT_DATA=(SERV
ER=DEDICATED)(SERVICE_NAME=SERVICE.com)))
SCHEMA: TESTSCHEMA
Connection successful with following credentials...
TNS: (DESCRIPTION=(ADDRESS=(PROTOCOL=TCP)(HOST=SERVER.com)(PORT=1521))(CONNECT_DATA=(SERV
ER=DEDICATED)(SERVICE_NAME=SERVICE.com)))
SCHEMA: SIT_SCHEMA
---------------------------------------------------------------------------

*****************************************************************************
No pre-deployment issues were found. Please proceed forward.
*****************************************************************************
Cleaning up project directory and file based variables
00:01
Job succeeded
```

FIG. 7M

```
********************************************************************************
Pre-deploy checks:
********************************************************************************
--------------------------------------------------------------------------------
Connection successful with following credentials...
TNS:
(DESCRIPTION=(ADDRESS=(PROTOCOL=TCP)(HOST=SERVER.com)(PORT=1521))(CONNECT_DATA=(SERVER=DEDICATED)(SERVICE_NAME=S
ERVICE.com)))
SCHEMA: TESTSCHEMA
Connection successful with following credentials...
TNS:
(DESCRIPTION=(ADDRESS=(PROTOCOL=TCP)(HOST=SERVER.com)(PORT=1521))(CONNECT_DATA=(SERVER=DEDICATED)(SERVICE_NAME=S
ERVICE.com)))
SCHEMA: SIT_SCHEMA
--------------------------------------------------------------------------------
********************************************************************************
DROP operations in scripts are listed below and are not permitted in CICD pipelines. Kindly exclude them before proceeding.
-------------------------------------------------------
 | FileName   | ObjectName | ObjectType | Operation  |
-------------------------------------------------------
 | 01_emp.sql | emp1       | TABLE      | DROP       |
-------------------------------------------------------
 | 04_emp.sql | emp4       | TABLE      | DROP       |
-------------------------------------------------------
 Count: 2
********************************************************************************
Cleaning up project directory and file based variables
00:01
Job succeeded
```

FIG. 7N

800
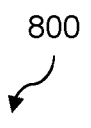
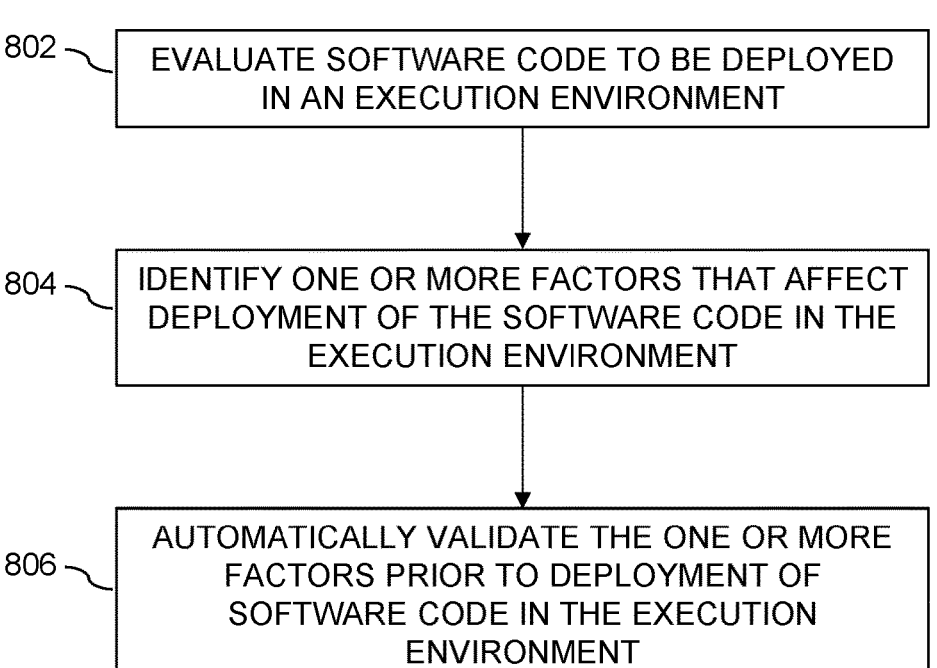
802 — EVALUATE SOFTWARE CODE TO BE DEPLOYED IN AN EXECUTION ENVIRONMENT
804 — IDENTIFY ONE OR MORE FACTORS THAT AFFECT DEPLOYMENT OF THE SOFTWARE CODE IN THE EXECUTION ENVIRONMENT
806 — AUTOMATICALLY VALIDATE THE ONE OR MORE FACTORS PRIOR TO DEPLOYMENT OF SOFTWARE CODE IN THE EXECUTION ENVIRONMENT
FIG. 8

AUTOMATED SOFTWARE VALIDATION FOR CONTINUOUS DEPLOYMENT IN AN INFORMATION PROCESSING SYSTEM

COPYRIGHT NOTICE

FIELD

The field relates generally to information processing systems, and more particularly to software management in such information processing systems.

DESCRIPTION

Software development presents technical problems for many organizations. As such, organizations typically utilize a continuous integration and continuous deployment (CI/CD) pipeline approach when developing software application programs (i.e., applications). The CI/CD pipeline streamlines the software development process and consists of a set of practices guiding both developers and operation teams to work together through a sequence of stages such as, by way of example, code build, automated tests execution, and code deployment to a target environment.

More particularly, a CI/CD pipeline consists of multiple stages which in turn can contain multiple jobs internally running scripts. A pipeline job, the fundamental element of the CI/CD pipeline, is picked up by a runner module and executed in the context of the runner module environment. Scripts within the job can refer to multiple internal/external configurations.

By way of example, there can be various internal configurations, such as variables, used within a script configuration file for dependent components. If these configurations are missing, the job will fail. Identifying the missing configuration, after job execution, by looking at the job logs during the change/deployment window consumes both time and resources.

By way of further example, external configurations include attributes such as target environment/platform connectivity, build artifacts required for deployment, and status of software components in the target environment. Verifying these configurations during deployment could lead to delay in deployment, and even rework in some cases such as updating the feature/development branch, running a functional and regression test, publishing new build artifacts and then planning production deployment on a later date which may require the same set of approvals with respect to change requests.

SUMMARY

Illustrative embodiments provide automated software validation techniques for use in software deployment environments such as, but not limited to, CI/CD pipeline environments.

For example, in one illustrative embodiment, a method comprises the following steps. The method evaluates software code to be deployed in an execution environment. The method identifies one or more factors that affect deployment of the software code in the execution environment. The method automatically validates the one or more factors prior to deployment of software code in the execution environment.

In further illustrative embodiments, the method may generate one or more results in response to the automatic validating and present the one or more results to enable one or more actions to be initiated prior to deployment of the software code in the execution environment.

Advantageously, illustrative embodiments mitigate or eliminate deployment problems and other issues by confirming the readiness of the execution environment, as well as the software code, so as to predict successful deployment of the software code before deploying the software code to the execution environment via the CI/CD pipeline.

These and other illustrative embodiments include, without limitation, apparatus, systems, methods and computer program products comprising processor-readable storage media.

BRIEF DESCRIPTION OF THE DRAWINGS

FIGS. 6A through 6N illustrate sample code executable by an automated software validation engine according to one or more illustrative embodiments.

FIGS. 7A through 7N illustrate use case results associated with an automated software validation engine according to one or more illustrative embodiments.

FIG. 8 illustrates an automated software validation methodology according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As mentioned, the software delivery process is typically facilitated by a CI/CD pipeline. For example, a CI/CD pipeline typically generates code, runs automated tests, and assists users in safely deploying new software versions. There are numerous factors that influence successful production deployment. By way of example, an effective deployment depends on the pipeline environment's accessibility to the software's server/platform. Additionally, the deployment configurations should be readily available during the deployment process. The software (e.g., application) may be required to communicate with the sources of dependencies during the deployment process. There are many other factors that influence successful production deployment. As a whole, the existing approach demands human hours and delays time to market which may result in compromised quality of a product. Several of these factors will be described below and illustrated in the context of FIGS. 1-4.

Figure 1:
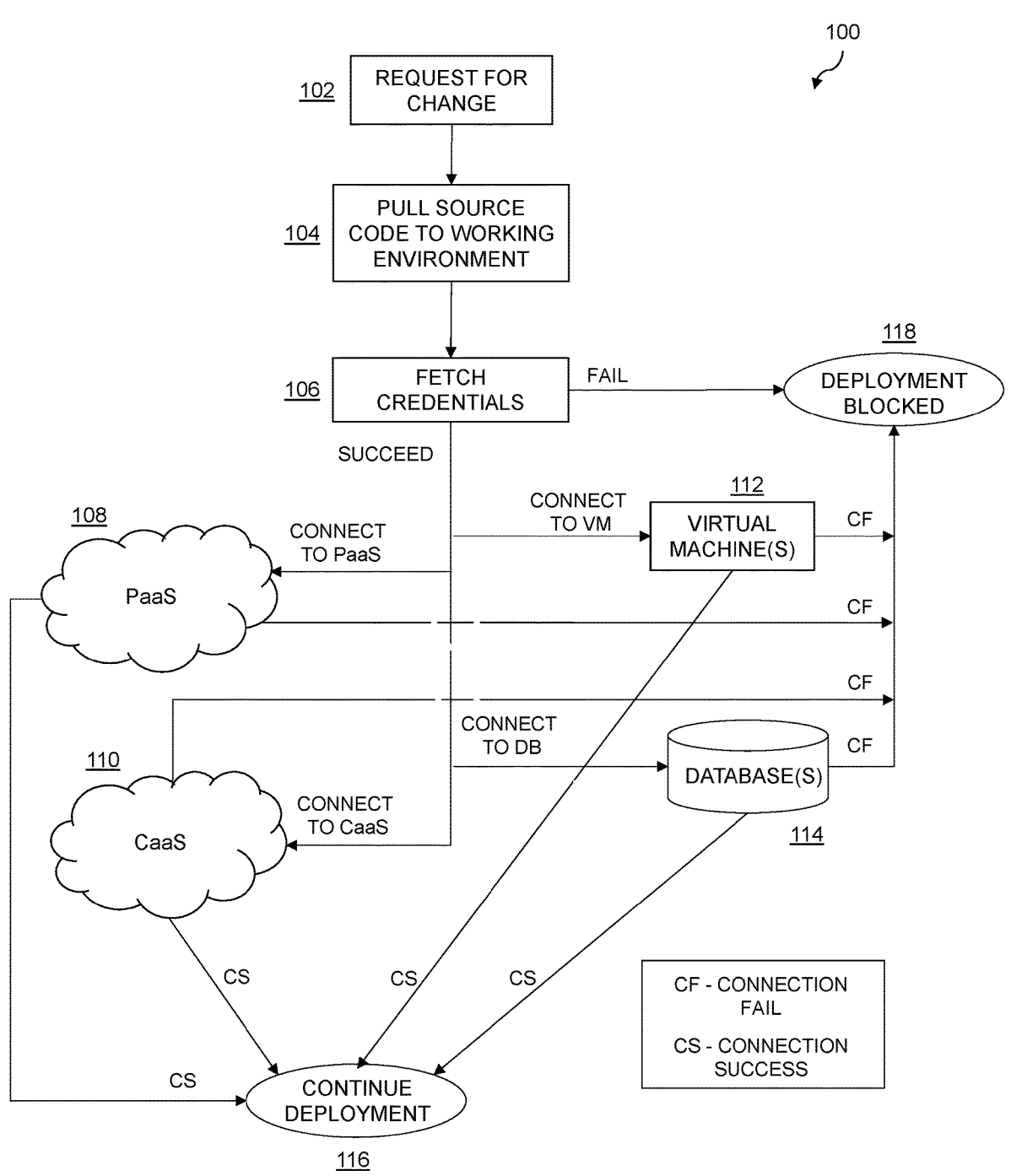
FIG. 1 illustrates a first deployment scenario wherein one or more illustrative embodiments can be implemented.

FIG. 1 illustrates a first deployment scenario 100. For a successful deployment, the server or platform where the application will be deployed must be reachable and accessible. When accessibility/reachability issues occur during production deployment, the job logs are not always sufficient to determine the root cause of the failure.

As shown in first deployment scenario 100 of FIG. 1, assume a request for a change in an application is received at step 102. Currently, during the deployment window, the application's source code is first retrieved into the working environment in step 104. Then, once the software change has been implemented in the application, the deployment credentials are fetched in step 106 from a secure (secret) management tool. Assuming that deployment credentials are successfully obtained in step 106, connections are made to a Platform-as-a-Service (PaaS) service 108, a Container-as-a-Service (CaaS) service 110, one or more virtual machines (VMs) 112, and one or more databases 114 to continue deployment 116.

However, deployment can be halted or blocked 118 when: (i) the pipeline job is unable to successfully fetch the credentials from the secret management tool; or (ii) credentials are fetched successfully from the secret management tool, but connectivity to the target environment/platform (e.g., one or more of PaaS service 108, CaaS service 110, VM(s) 112, database(s) 114) with retrieved credentials fails.

Figure 2:
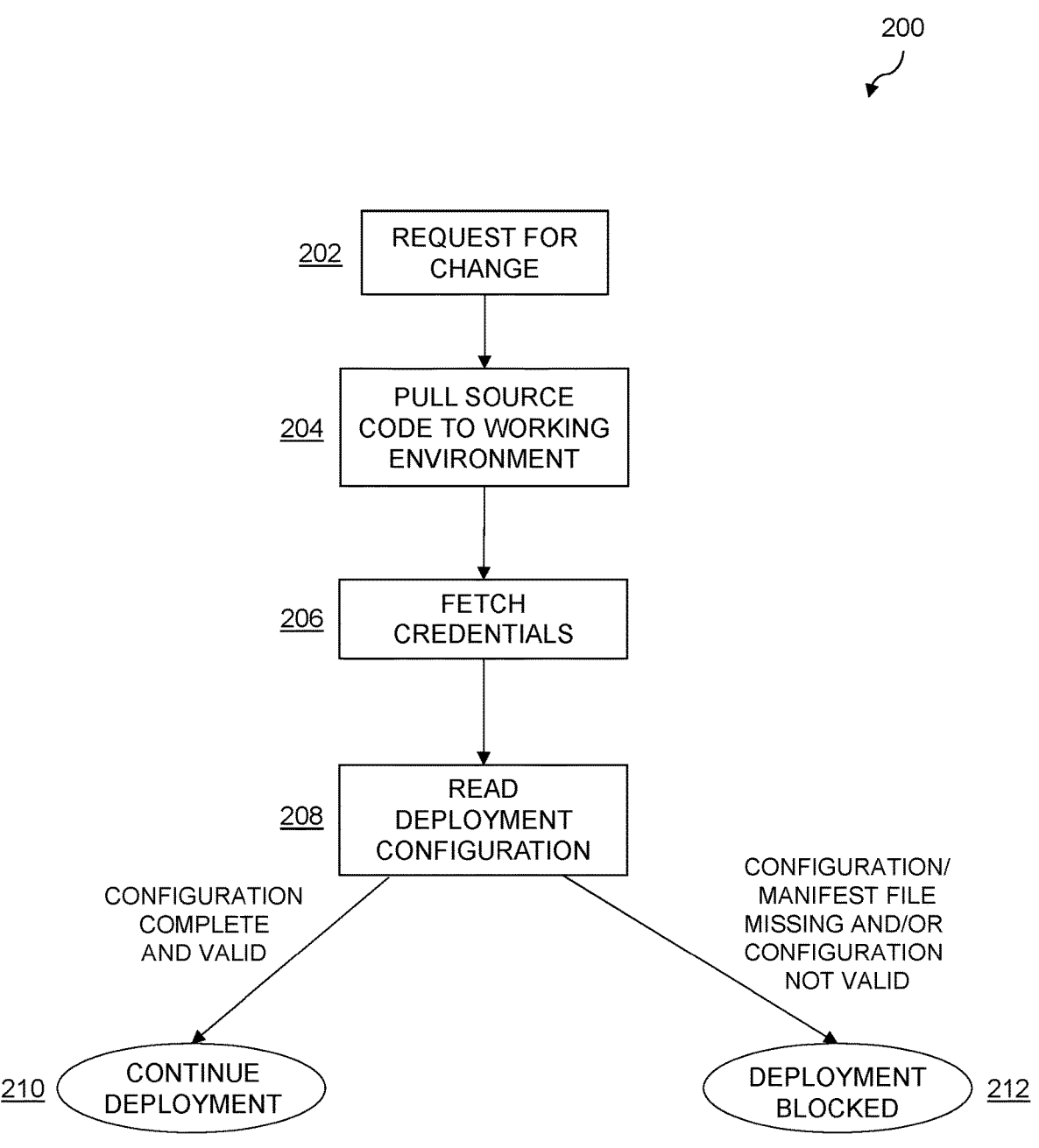
FIG. 2 illustrates a second deployment scenario wherein one or more illustrative embodiments can be implemented.

FIG. 2 illustrates a second deployment scenario 200. For a successful deployment, the existence and correctness of the deployment configurations are necessary. Any issues related to configurations might lead to delay in deployment as it could require reviewing the configuration files or even rework as in updating the values and pushing the code again.

As shown in second deployment scenario 200 of FIG. 2, assume a request for a change in an application is received at step 202. Currently, during the deployment window, the application's source code is first retrieved into the working environment in step 204. Then, once the software change has been implemented in the application, the deployment credentials are fetched in step 206 from a secure (secret) management tool. Assuming that deployment credentials are successfully obtained in step 206 and connectivity to the target environment/platform is established, a deployment configuration file is read in step 208. When the configuration is determined to be complete and valid, deployment is continued 210. However, deployment can be halted or blocked 212 when: (i) a required configuration such as a PaaS deployment manifest file or a build artifact is missing; or (ii) a required configuration such as a CaaS deployment and service files exist but do not have valid formats/values.

Figure 3:
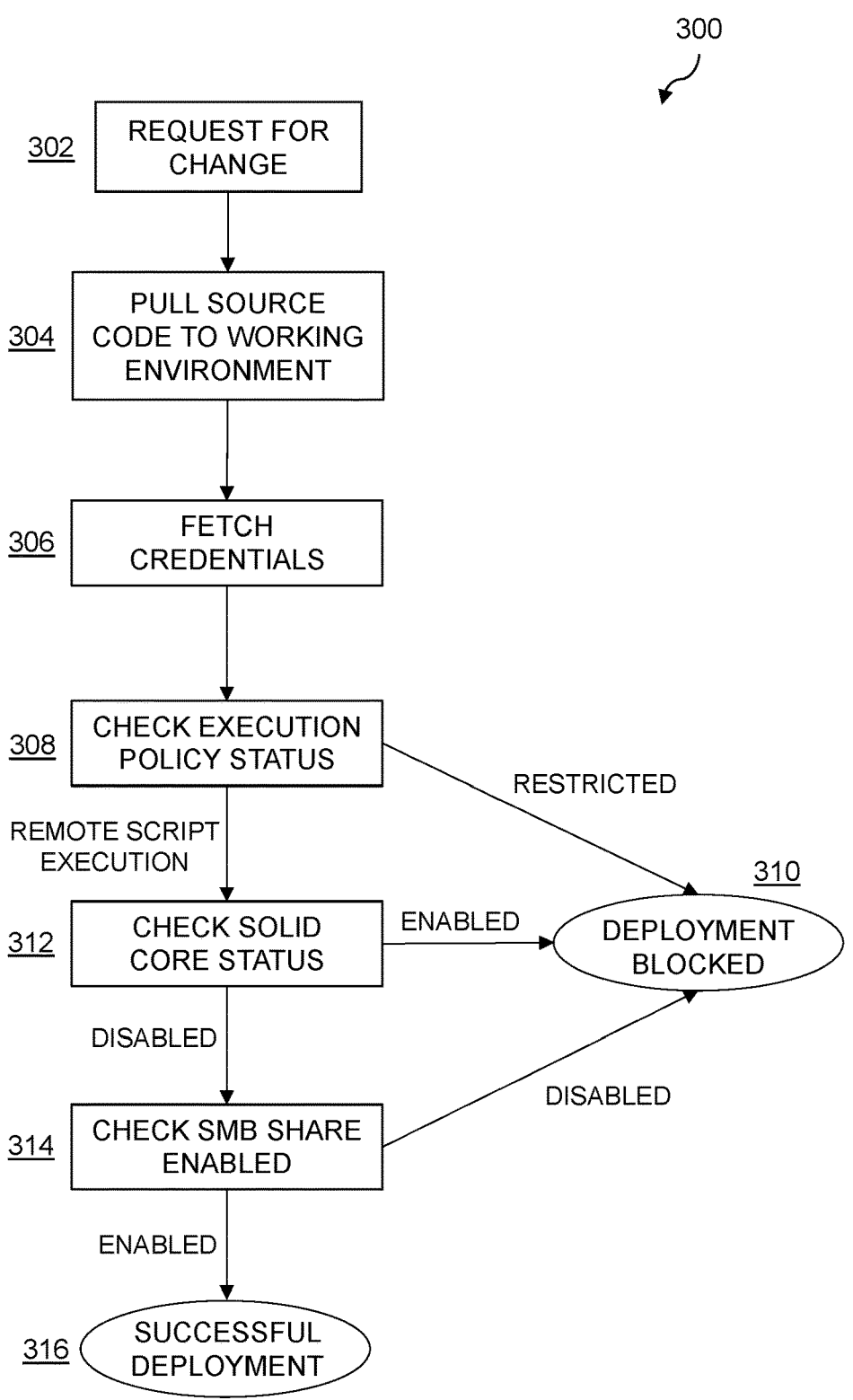
FIG. 3 illustrates a third deployment scenario wherein one or more illustrative embodiments can be implemented.

FIG. 3 illustrates a third deployment scenario 300. It is realized that the target platform or server to which the application is being deployed also depends on its state. As with a Windows server, for example, the script execution policy should be unrestricted before deploying the application.

As shown in third deployment scenario 300 of FIG. 3, assume a request for a change in an application is received at step 302. Currently, during the deployment window, the application's source code is first retrieved into the working environment in step 304. Then, once the software change has been implemented in the application, the deployment credentials are fetched in step 306 from a secure (secret) management tool. Assuming that deployment credentials are successfully obtained in step 306 and connectivity to the target environment/platform is established, an attempt to deploy the application is executed based on the deployment job definition.

The deployment on the target server (environment/platform) depends on the execution policy, i.e., a property on the target server, which can be in a restricted state by default to avoid remote execution of the script and, hence, block the deployment. Thus, the execution policy status is checked in step 308. If restricted, then deployment is blocked 310. However, if not restricted, remote script execution occurs. In a similar manner, the software component that provides change monitoring, change prevention, and whitelisting features (e.g., Solid Core) is checked in step 312, and the network file sharing protocol that allows applications on a computer to read and write to files and to request services from server programs in a computer network (e.g., Server Message Block or SMB) is checked in step 314. If Solid Core monitoring is enabled or if SMB share is disabled, the deployment is blocked 310. Otherwise, deployment is successful 316.

Figure 4:
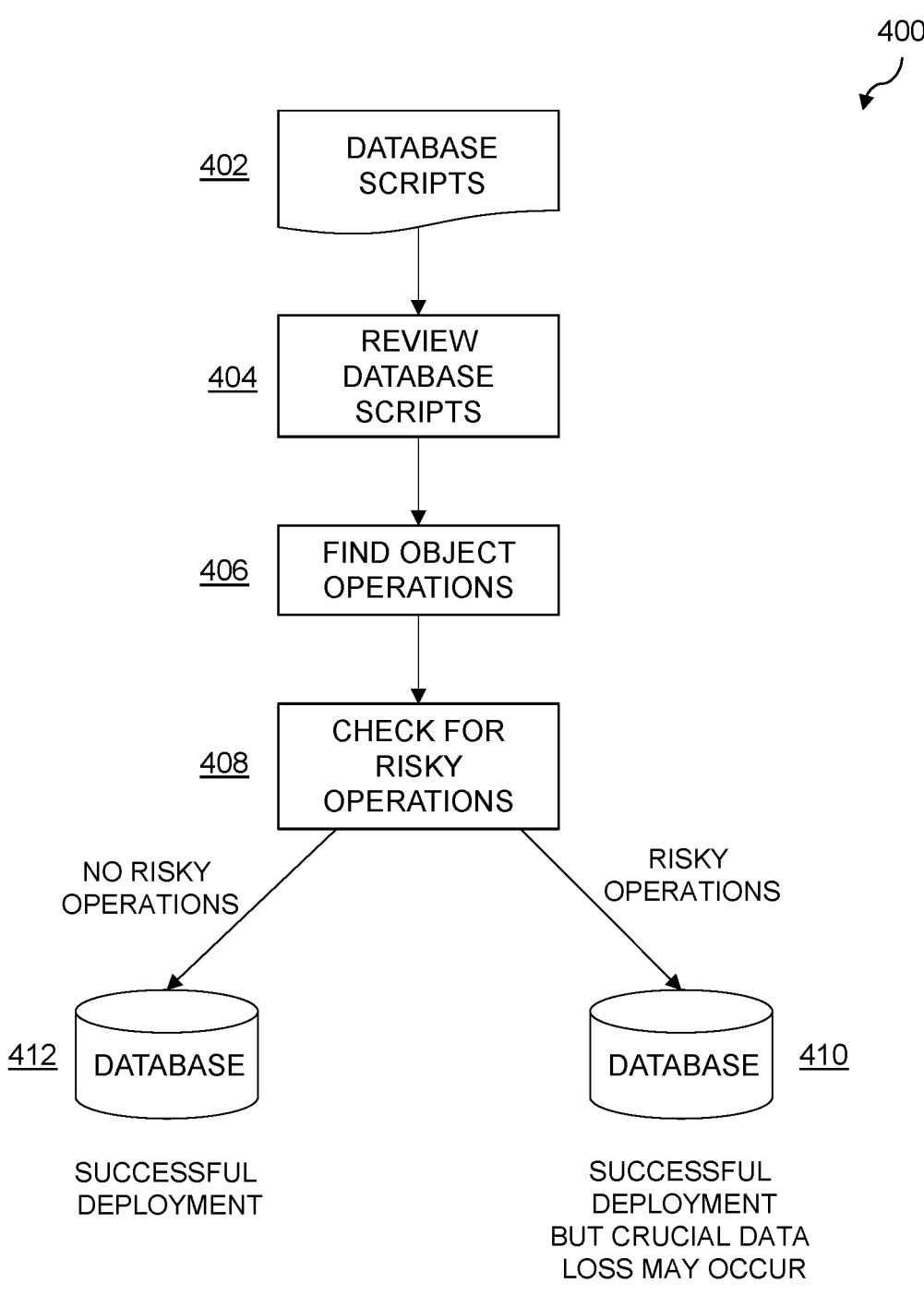
FIG. 4 illustrates a fourth deployment scenario wherein one or more illustrative embodiments can be implemented.

FIG. 4 illustrates a fourth deployment scenario 400. It is realized that application source code may contain risky operations, e.g., any drop statement in the structured query language (SQL) scripts. Although such a drop statement would not necessarily halt the deployment, it could lead to crucial data loss.

As shown in fourth deployment scenario 400 of FIG. 4, database scripts 402 are reviewed in step 404 for the object operations present (step 406). In case there are any risky operations (step 408), such as drop operations, deployment can be completed but with crucial data loss (e.g., database 410). If no risky operations are found in step 408, deployment is deemed successful (e.g., database 412).

Accordingly, illustrative embodiments overcome the above and other drawbacks with existing deployment approaches by providing a process which automatically performs a set of pre-deployment validations of a CI/CD pipeline and target environment based on a set definition such that developers obtain timely feedback before deploying the application via the CI/CD pipeline to the target environment.

An automated software validation engine according to one or more illustrative embodiments thus helps mitigate the problems with the above (FIGS. 1-4) and other scenarios by confirming the readiness of the target environment based on a set of definitions so as to predict successful deployment of an application, before deploying the application to the target environment via the CI/CD pipeline.

More particularly, an automated software validation engine according to one or more illustrative embodiments provides application owners the flexibility to, at any time, confirm that their CI/CD pipelines and application environment are ready for use in a production deployment. Any gaps recorded during this validation process can be fixed before production deployment begins.

Figure 5:
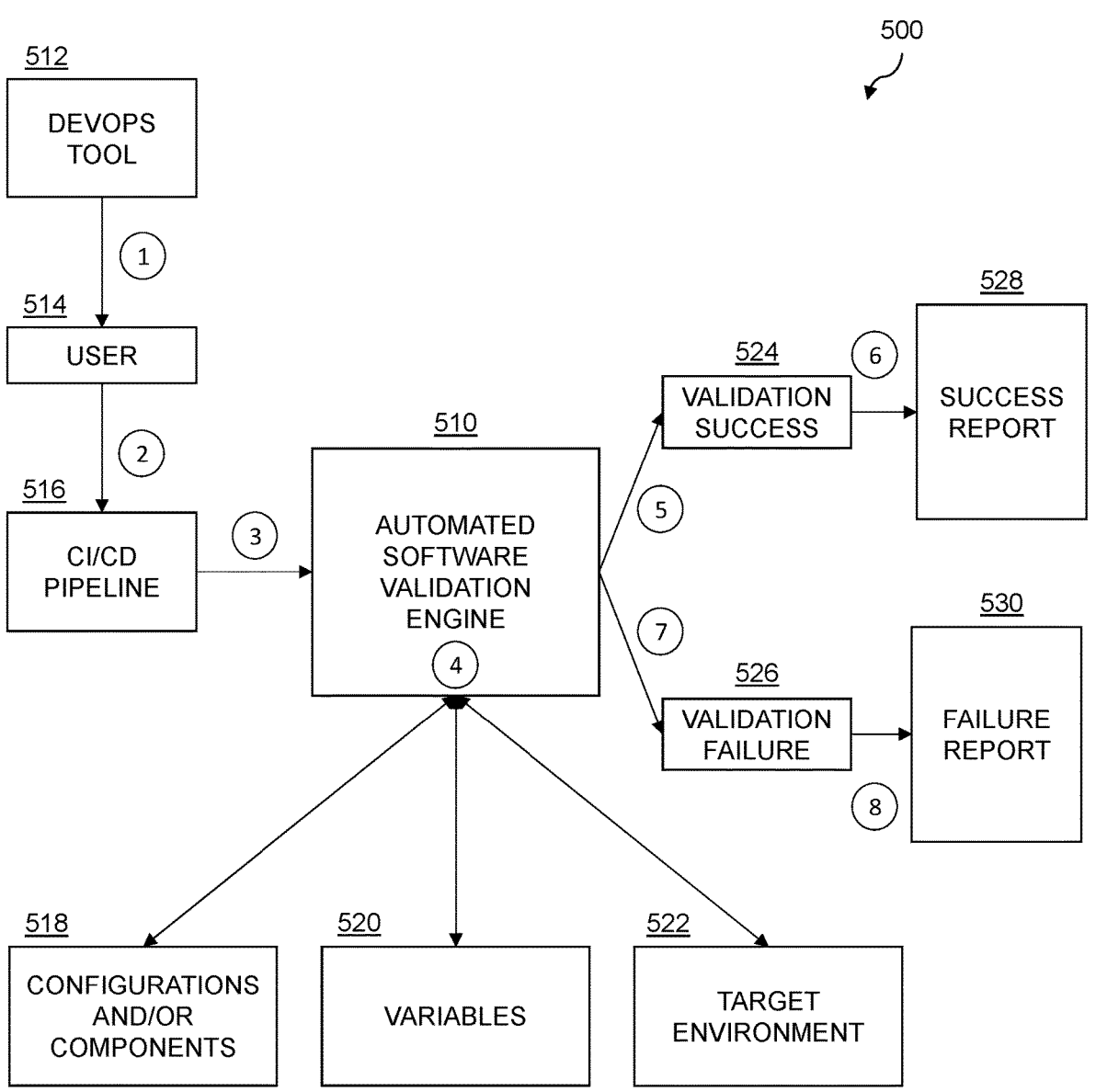
FIG. 5 illustrates an information processing system environment with an automated software validation engine according to an illustrative embodiment.

FIG. 5 illustrates an information processing system environment 500 according to an illustrative embodiment. More particularly, process flow steps (denoted as circled numbers 1-8) associated with an automated software validation engine 510 (also referred to herein as an auto-validator) are shown in information processing system environment 500. Information processing system environment 500 also depicts a DevOps tool 512, a user 514, a CI/CD pipeline 516, configurations and/or components 518, variables 520, a target environment 522, a validation success branch 524, a validation failure branch 526, a success report 528, and a failure report 530.

It is assumed that the source code for a given application to be deployed is maintained in a DevOps tool 512. DevOps refers to a combination of practices designed to increase the ability to deliver applications. Non-limiting examples of DevOps tools include GitLab, GitHub, and Bitbucket. As depicted in process flow step 1, DevOps tool 512 is polled continuously for triggers to a CI/CD pipeline 516. For example, CI/CD pipeline 516 is triggered (e.g., process flow step 2) as soon as user 514 (e.g., administrator and/or system) commits changes to the source code.

For CI/CD pipeline 516, as per process flow step 3, automated software validation engine 510 predicts deployment success before actual deployment. As per process flow step 4, automated software validation engine 510 performs this prediction by validating the existence of configurations and/or components 518 and identifies variables 520, as will be further explained herein. These validations are carried out on target environment 522, e.g., a database, a VM, a cloud-native cluster, a cloud platform, a server, etc.

Validation success branch 524 represents each successful validation for CI/CD pipeline 516 (e.g., process flow step 5). Successful validations are published as a success report 528 (e.g., process flow step 6). Validation failure branch 526 represents each failed (or partially failed) validation for CI/CD pipeline 516 (e.g., process flow step 7). Failed (or partially failed) validations are published as a failure report 530 (e.g., process flow step 8).

Further it is realized herein that in the case of a production environment (e.g., a customer site) deployment failure, there are high chances that the production environment was not ready. Automated software validation engine 510 can therefore be implemented as an agent (software module) in the CI/CD pipeline flow that is triggered so as to detect such failures in advance of production deployment.

As mentioned above, one critical factor for a production deployment failure is the target environment (e.g., VMs, PaaS platforms such as Cloud Foundry, CaaS platform) being unreachable. To ensure the deployment's success, automated software validation engine 510 examines server/platform access and performs an authentication check on the deployment account prior to actual deployment.

Also, as mentioned above, application deployment relies on deployment configurations having components (i.e., configurations and/or components 518) such as manifest files for PaaS deployments or deployment/service yml for CaaS deployment or any general configuration files and mandatory components such as build artifacts. If a deployment configuration does not exist or is missing needed information, actual deployment may be blocked. To ensure the deployment's success, automated software validation engine 510 validates the existence and authenticity of the relevant configuration manifest files and build artifacts.

In a few other cases, as mentioned above, if mandatory variables (i.e., variables 520) are missing, actual deployment fails. To ensure the deployment's success, automated software validation engine 510 checks to verify if all required variables have been declared, and if not, it will identify those that are missing, so that the user (i.e., user 514) can simply add them.

Still further, when deploying an application in a secure environment, certain parameters on VMs or platforms are disabled by default, blocking the actual deployment. To ensure the deployment's success, automated software validation engine 510 is configured to evaluate security settings on target environments such as remote execution policy and SMB protocol status and notify the same to the developer.

Data loss may occur as a result of database programs performing potentially hazardous (risky) operations. Automated software validation engine 510 assists in warning developers about the existence of such high-risk operations before they are deployed. This allows them to take appropriate action and save time during production deployment mitigating issues brought on by the execution of such operations.

FIGS. 6A through 6N illustrate sample code for validations executable by automated software validation engine 510 according to one or more illustrative embodiments. It is to be appreciated that other validations can be executed by automated software validation engine 510 depending on the target environment in which an application is being deployed.

More particularly, FIGS. 6A through 6E are collectively examples of validation with respect to authentication and connectivity to the target environment/platform. FIG. 6A is sample code executable by automated software validation engine 510 to retrieve Kubernetes cluster credentials, together with a list of namespaces, for successful authentication. If authentication is unsuccessful, developers are advised by automated software validation engine 510 to check the details in their Kube configuration files. FIG. 6B is sample code executable by automated software validation engine 510 to validate a database connection by checking that all required arguments are present before executing the connection validation command with the aforementioned parameters. Automated software validation engine 510 then indicates if the connection was established successfully or not. FIG. 6C is sample code executable by automated software validation engine 510 to establish connection to a Docker container system. Based on a report from automated software validation engine 510, a developer can determine if login was successful, login was successful but with warnings, or a login attempt failed. The developer can then take appropriate action based on the results of the login command execution. FIG. 6D is sample code executable by automated software validation engine 510 to establish the connection to a PaaS platform, e.g., Cloud Foundry. Based on the outcomes of the login command execution, the developer can determine whether they were able to login successfully or whether their attempt failed and take the necessary action. FIG. 6E is sample code executable by automated software validation engine 510 to validate connection establishment to a Windows VM (server) by first checking to see if all necessary arguments are available before running the connection validation command with the previously mentioned parameters. Automated software validation engine 510 then indicates if the connection was established successfully or not.

Further, FIGS. 6F and 6G are collectively examples of validation with respect to PaaS deployment manifest/CaaS deployment files/app configurations existence and validity. FIG. 6F is sample code executable by automated software validation engine 510 to check to see if the PaaS manifest file path provided by the developer is present in their code repository. As soon as the file path has been validated, automated software validation engine 510 shows the result so that the developer can, if necessary, take additional action. FIG. 6G is sample code executable by automated software validation engine 510, for a CaaS solution (e.g., Pivotal Container Service), to check the deployment or service file location specified by the developer to see if it exists in the repository. Once the file path has been validated, automated software validation engine 510 displays the results so that the developer can, if necessary, take further action.

FIG. 6H is sample code executable by automated software validation engine 510 to validate a build artifact existence, and subsequently display the status.

FIGS. 6I and 6J are sample code executable by automated software validation engine 510 to identify the existence of a potentially high-risk operation. Database script files that need to be deployed are iterated for this validation operation. If such an operation is found, information about the file name, object name, object type, and operation type is logged and displayed to the developer in a tabular format by automated software validation engine 510.

FIGS. 6K through 6M are collectively examples of validation with respect to default security restrictions in the target environment. To ensure the deployment's success, automated software validation engine 510 is configured to evaluate security settings on target environments such as for Solid Core status (FIG. 6K), SMB share status (FIG. 6L), and remote execution policy status (FIG. 6M), notify the same to developer, and enable the target environment to continue the deployment.

FIG. 6N is sample code executable by automated software validation engine 510 to demonstrate the validation of variables needed for deployment. The variable value is displayed by automated software validation engine 510 if it has been declared and is accurate. If not, the developer is immediately provided with relevant details by automated software validation engine 510 so they can take the correct action.

Advantageously, automated software validation engine 510 automatically validates the continuous deployment components of a CI/CD pipeline, mitigates the possibilities of deployment failure, and provides quality output with improved developer experience. In some embodiments, automated software validation engine 510 is loosely coupled to the continuous deployment enabling introduction of future validation enhancements with little to no impact to the CI/CD pipeline.

More particularly, if the server is unavailable or connectivity is lost, the deployment might fail. Prior to production deployment, automated software validation engine 510 facilitates handling the deployment account's accessibility check and confirming the server/platform accessibility. This enhances the likelihood of deployment success.

For a deployment to be successful, the component build artifacts and files such as manifest, service, and deployment files are required. Before deploying to a production environment, automated software validation engine 510 confirms that the build artifacts and necessary configuration/manifest files exist and are valid. Since automated software validation engine 510 operates before production deployment, it forecasts the probability of failure due to missing components or configuration and hence benefits the user with improved deployment during the deployment window.

Further, as mentioned, script for deployment may include variables. If any mandatory variable is missing, then the deployment fails. Automated software validation engine 510 verifies if all required variables are declared, and if not, it identifies those that are missing so that the user may simply add them. Automated software validation engine 510 does the job for the user and no human efforts are needed to identify the missing variable(s), thus shortening time to deployment completion.

Some aspects of target environments' security settings, such as remote execution policies and SMB protocols, may block the deployment. Automated software validation engine 510 is configured to run any time in the application development cycle to validate if any properties or policies can block the production deployment on the target and takes necessary actions such as updating the properties or notifying users about the misconfiguration on the target environment.

This removes troubleshooting from the deployment process and hence prepares the target environment for smooth deployment.

Still further, as mentioned, data loss may occur because of database scripts with potentially harmful operations. Automated software validation engine 510 assists in alerting users to the existence of such operations before they are deployed, allowing them to take the appropriate action and saving them from having to spend time during production deployment in mitigating the issues brought on by the execution of such operations.

FIGS. 7A through 7N illustrate use case results associated with an automated software validation engine according to one or more illustrative embodiments. In some embodiments, use case results are presented to a user as one or more of success report 528 and failure report 530.

Assuming, in a first example, Cloud Foundry is utilized as the PaaS solution, result behavior of automated software validation engine 510 with respect to PaaS authentication is shown in FIGS. 7A and 7B. More particularly, if PaaS credentials are correct, automated software validation engine 510 generates a success report such as shown in FIG. 7A. However, if PaaS login credentials are not correct, automated software validation engine 510 reports the failure with the details as shown in FIG. 7B.

In a second example, assuming legacy applications are being deployed to a Windows VM, result behavior of automated software validation engine 510 with respect to traditional Windows VM authentication is shown in FIGS. 7C and 7D. More particularly, if the server's name is valid, automated software validation engine 510 generates a success report such as shown in FIG. 7C. However, if the server's name is not valid, automated software validation engine 510 reports the failure with the details as shown in FIG. 7D.

In a third example, result behavior of automated software validation engine 510 with respect to database authentication is shown in FIGS. 7E and 7F. More particularly, if the database connection details (e.g., connection string or deployment credentials) are correct, automated software validation engine 510 generates a success report such as shown in FIG. 7E. However, if the database connection details are not correct, automated software validation engine 510 reports the failure with the details as shown in FIG. 7F.

Assuming, in a fourth example, Pivotal Container Service (PKS) is utilized as the CaaS solution, result behavior of automated software validation engine 510 with respect to CaaS authentication is shown in FIGS. 7G and 7H. More particularly, if an authentication token is correct, automated software validation engine 510 generates a success report such as shown in FIG. 7G. However, if the authentication token is not correct, automated software validation engine 510 reports the failure with the details as shown in FIG. 7H.

Assuming, in a fifth example, a Jfrog artifact repository tool is utilized to manage/store build artifacts, result behavior of automated software validation engine 510 with respect to validating the existence of required build artifacts in the artifact repository is shown in FIGS. 7I and 7J. More particularly, if the build artifact required for deployment exists at the specified path, automated software validation engine 510 generates a success report such as shown in FIG. 7I. However, if the build artifact required for deployment does not exist at the specified path, automated software validation engine 510 reports the failure with the details as shown in FIG. 7J.

In a sixth example, result behavior of automated software validation engine 510 with respect to verifying the declaration of mandatory variables is shown in FIGS. 7K and 7L. More particularly, if all mandatory variables are declared, automated software validation engine 510 generates a success report such as shown in FIG. 7K. However, if one or more mandatory variables are not declared, automated software validation engine 510 reports the failure with the details as shown in FIG. 7L.

In a seventh example, result behavior of automated software validation engine 510 with respect to verifying the existence of potentially high-risk (risky) operations in the source code of the application is shown in FIGS. 7M and 7N. Assume the use of a non-SQL (NoSQL) syntax and a Relational Database Management System (RDBMS), one example of a high-risk operation is an RDBMS drop operation. More particularly, if no high-risk operations, such as a RMBS drop operation, are detected in the source code, automated software validation engine 510 generates a success report such as shown in FIG. 7M. However, any high-risk operations are detected in the source code, automated software validation engine 510 reports the failure with the details as shown in FIG. 7N.

FIG. 8 illustrates an automated software validation methodology 800 according to an illustrative embodiment. As shown, step 802 evaluates software code to be deployed in an execution environment. Step 804 identifies one or more factors that affect deployment of the software code in the execution environment. Step 806 automatically validates the one or more factors prior to deployment of software code in the execution environment.

One or more results may then be generated in response to the automatic validating and presented to a user to enable one or more actions to be initiated prior to deployment of the software code in the execution environment.

Advantageously, illustrative embodiments mitigate or eliminate deployment problems and other issues by confirming the readiness of the execution environment, as well as the software code, so as to predict successful deployment of the software code before deploying the software code to the execution environment via the CI/CD pipeline.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for intelligent data simulation will now be described in greater detail with reference to FIGS. 9 and 10. Although described in the context of information processing system environment 500, these platforms may also be used to implement at least portions of other information processing systems in other embodiments.

Figure 9:
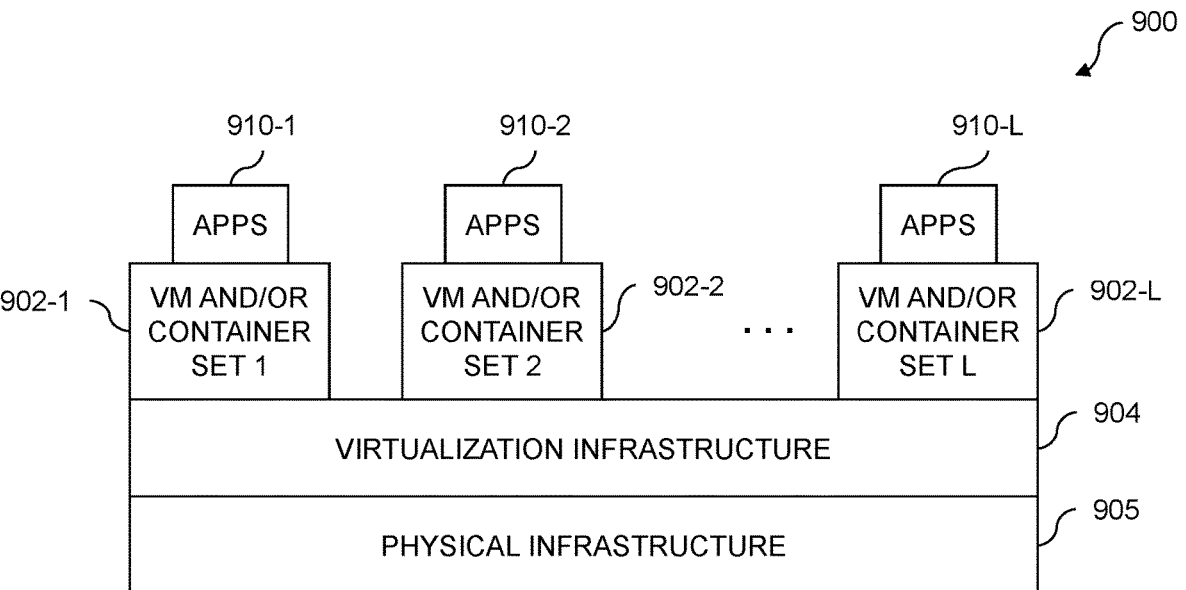
FIGS. 9 and 10 illustrate examples of processing platforms that may be utilized to implement at least a portion of an information processing system in illustrative embodiments.

FIG. 9 shows an example processing platform comprising cloud infrastructure 900. The cloud infrastructure 900 comprises a combination of physical and virtual processing resources that may be utilized to implement at least a portion of the information processing system environment 500 in FIG. 5. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2 . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 500 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of information processing system environment 500 and includes a plurality of processing devices, denoted 1002-1, 1002-2, 1002-3 . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Figure 10:
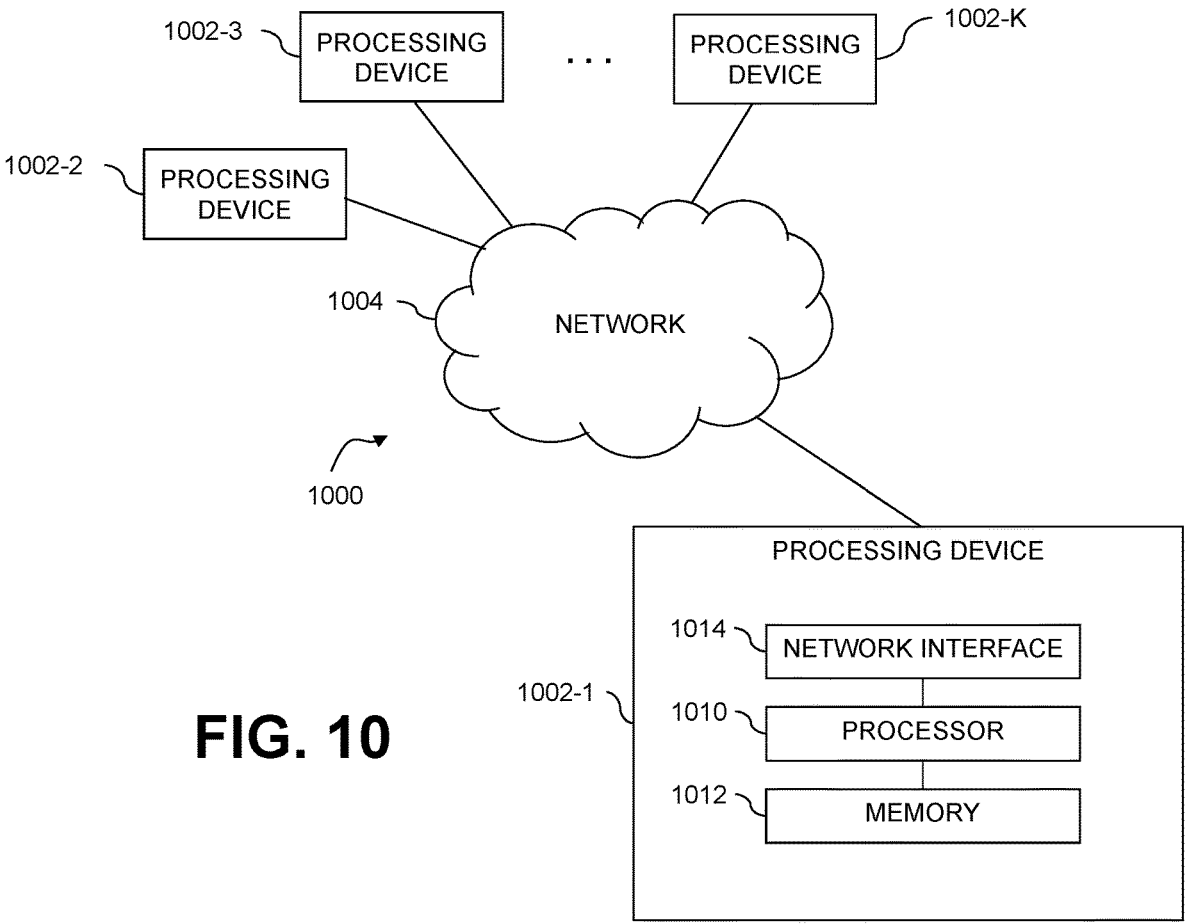

Advantageously, automated software validation engine 510 is configured to improve the operation of the FIG. 9 and FIG. 10 processing platforms (or any target processing platform with which it operates) by reducing computing, storage and/or network resources needed to achieve successful deployment of a software program on the FIG. 9 and FIG. 10 processing platforms. As explained herein, by automatically validating the one or more factors that affect successful deployment, corrective operations do not have to be executed on the FIG. 9 and FIG. 10 processing platforms to mitigate or eliminate any adverse impacts of the one or more factors. Such mitigation/elimination significantly saves computer instruction operations, as well as data storage requirements and network communication bandwidth, which would otherwise be needed to address deployment problems that occur at the time of deployment.

Again, the particular processing platform 1000 shown in the figure is presented by way of example only, and information processing system environment 500 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated validation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory, the at least one processing device, when executing program code, operates as an automated software validation engine configured to:

evaluate software code to be deployed in an execution environment;

identify one or more factors that affect deployment of the software code in the execution environment; and automatically validate the one or more factors prior to deployment of software code in the execution environment, the automatically validating comprising at least automatically verifying the existence of one or more variable declarations associated with a deployment script.

2. The apparatus of claim 1, wherein the automatic validating of the one or more factors is executed in the context of a software deployment pipeline.

3. The apparatus of claim 2, wherein the software deployment pipeline comprises a continuous integration/continuous deployment pipeline.

4. The apparatus of claim 1, wherein automatically validating the one or more factors prior to deployment of software code in the execution environment further comprises automatically verifying at least one of a connectivity to and an authentication with the execution environment.

5. The apparatus of claim 1, wherein automatically validating the one or more factors prior to deployment of software code in the execution environment further comprises automatically verifying a configuration readiness of the execution environment.

6. The apparatus of claim 1, wherein automatically validating the one or more factors prior to deployment of software code in the execution environment further comprises automatically verifying the existence of one or more components for deploying the software code in the execution environment.

7. The apparatus of claim 1, wherein automatically validating the one or more factors prior to deployment of software code in the execution environment further comprises automatically verifying a status of one or more blocking parameters associated with the execution environment.

8. The apparatus of claim 1, wherein automatically validating the one or more factors prior to deployment of software code in the execution environment further comprises automatically verifying the existence of one or more high-risk operations in the software code.

9. The apparatus of claim 1, wherein the automated software validation engine is further configured to:

generate one or more results in response to the automatic validating; and present the one or more results to enable one or more actions to be initiated prior to deployment of the software code in the execution environment.

10. A method comprising:

evaluating, via an automated software validation engine, software code to be deployed in an execution environment;

identifying, via the automated software validation engine, one or more factors that affect deployment of the software code in the execution environment; and automatically validating, via the automated software validation engine, the one or more factors prior to deployment of software code in the execution environment, the automatically validating comprising at least automatically verifying the existence of one or more variable declarations associated with a deployment script;

wherein the automated software validation engine is implemented by at least one processing device comprising a processor coupled to a memory configured to execute program code.

11. The method of claim 10, wherein automatically validating the one or more factors prior to deployment of software code in the execution environment further comprises automatically verifying at least one of a connectivity to and an authentication with the execution environment.

12. The method of claim 10, wherein automatically validating the one or more factors prior to deployment of software code in the execution environment further comprises automatically verifying a configuration readiness of the execution environment.

13. The method of claim 10, wherein automatically validating the one or more factors prior to deployment of software code in the execution environment further comprises automatically verifying the existence of one or more components for deploying the software code in the execution environment.

14. The method of claim 10, wherein automatically validating the one or more factors prior to deployment of software code in the execution environment further comprises automatically verifying a status of one or more blocking parameters associated with the execution environment.

15. The method of claim 10, wherein automatically validating the one or more factors prior to deployment of software code in the execution environment further comprises automatically verifying the existence of one or more high-risk operations in the software code.

16. The method of claim 10, further comprising:

generating, via the automated software validation engine, one or more results in response to the automatic validating; and presenting, via the automated software validation engine, the one or more results to enable one or more actions to be initiated prior to deployment of the software code in the execution environment.

17. The method of claim 10, wherein the automatic validating of the one or more factors is executed in the context of a continuous integration/continuous deployment pipeline.

18. A computer program product comprising a non-transitory processor-readable storage medium having stored therein program code of one or more software programs, wherein the program code when executed by at least one processing device cause the at least one processing device to operate as an automated software validation engine configured to:

evaluate software code to be deployed in an execution environment;

identify one or more factors that affect deployment of the software code in the execution environment; and automatically validate the one or more factors prior to deployment of software code in the execution environment, the automatically validating comprising at least automatically verifying the existence of one or more variable declarations associated with a deployment script.

19. The computer program product of claim 18, wherein the automatic validating of the one or more factors is executed in the context of a software deployment pipeline.

20. The computer program product of claim 19, wherein the software deployment pipeline comprises a continuous integration/continuous deployment pipeline.

\* \* \* \* \*